United States Patent [19]

Büttner

[11] 4,112,839
[45] Sep. 12, 1978

[54] APPARATUS FOR CONNECTING THE TYING MEANS ENDS ON TYING MACHINES

[76] Inventor: Hans Hugo Büttner, Obmettmann 13, 4020 Mettmann, Fed. Rep. of Germany

[21] Appl. No.: 777,098

[22] Filed: Mar. 14, 1977

[30] Foreign Application Priority Data

Apr. 12, 1976 [DE] Fed. Rep. of Germany ....... 2616033

[51] Int. Cl.² ............................................. B65B 13/24
[52] U.S. Cl. ................. 100/33 PB; 156/530
[58] Field of Search ............ 100/27, 29, 33 R, 33 PB; 53/198 R; 156/499, 530

[56] References Cited

U.S. PATENT DOCUMENTS

| 3,841,055 | 10/1974 | Takami | 100/33 PB |
|---|---|---|---|
| 3,851,576 | 12/1974 | Takahashi | 100/33 PB |
| 3,858,503 | 1/1975 | Takahashi | 100/33 PB |
| 3,863,557 | 2/1975 | Takahashi | 100/33 PB |
| 3,914,153 | 10/1975 | Sato | 100/33 PB |

Primary Examiner—Billy J. Wilhite
Attorney, Agent, or Firm—Martin A. Farber

[57] ABSTRACT

An apparatus for connecting the ends of the tying means on tying machines, by which the tying means ends are pressed together between an upper and a lower pressing jaw and by which a gripper is provided which is displaceable from one side of the tying position to the other side, and a cutter-knife for separating the tying means is coordinated to the gripper. The lower pressing jaw is disposed on one side surface of the gripper and is displaced with the latter.

11 Claims, 8 Drawing Figures

FIG. 1

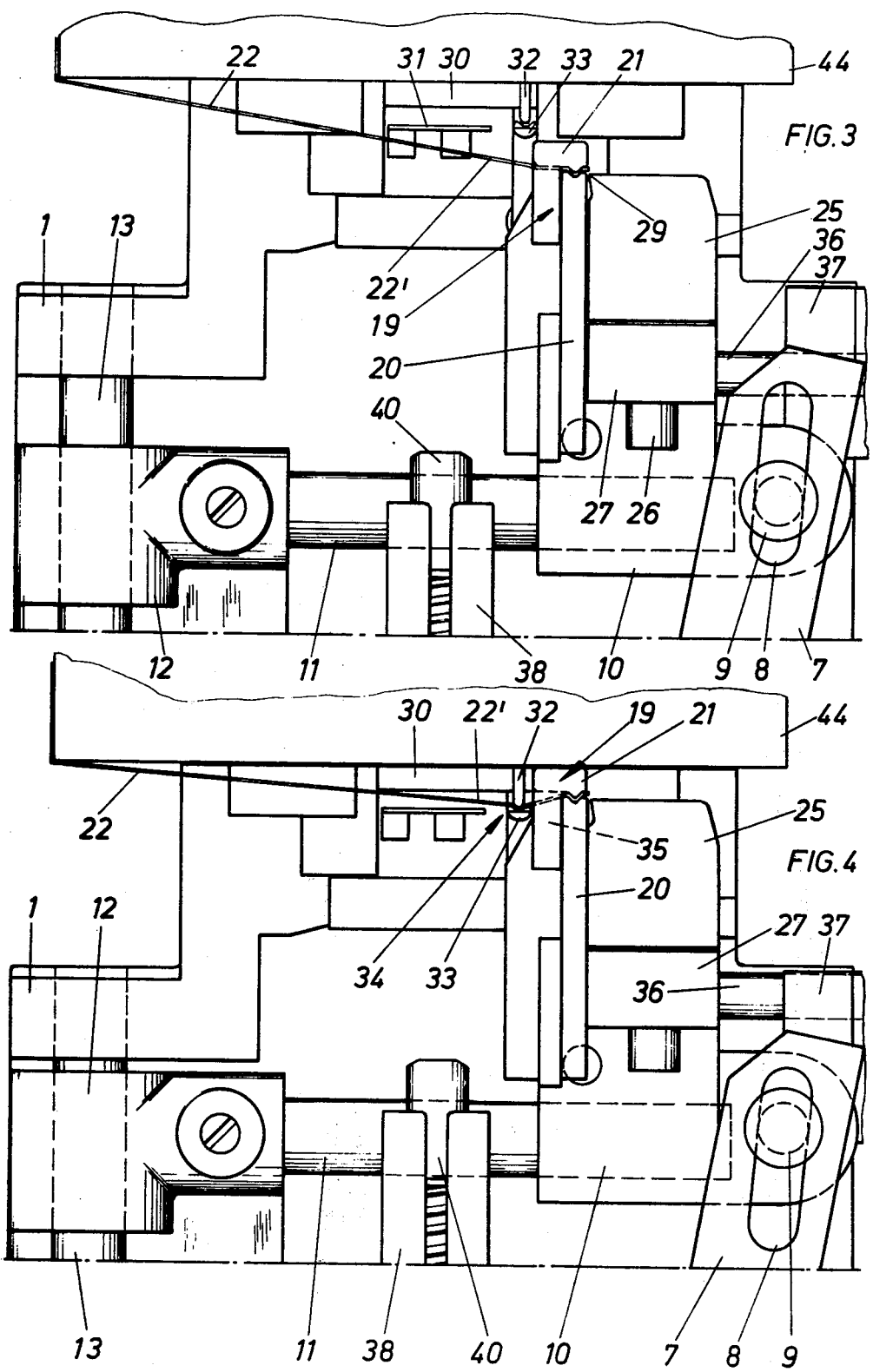

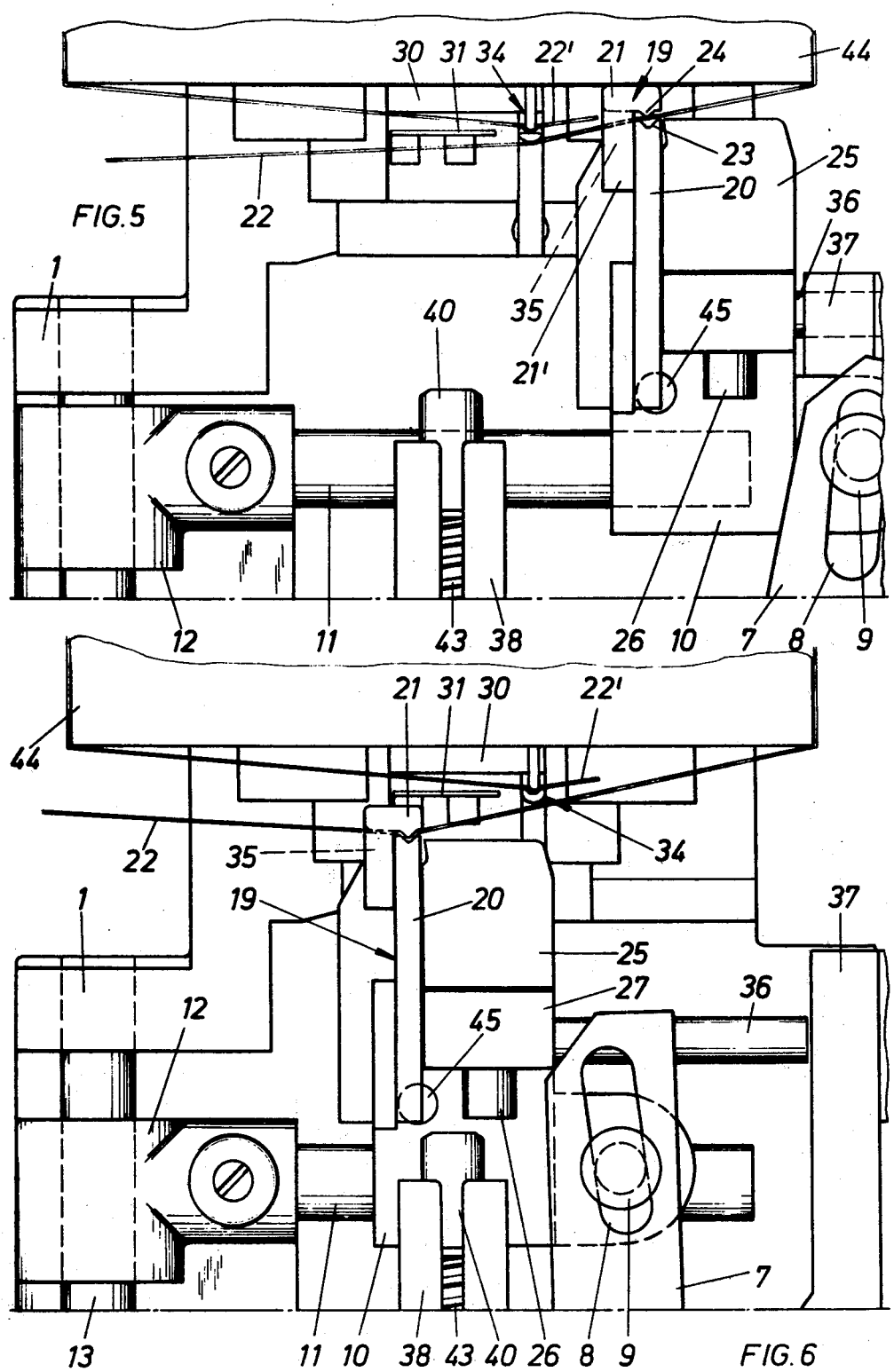

APPARATUS FOR CONNECTING THE TYING MEANS ENDS ON TYING MACHINES

The invention relates to an apparatus for connecting the ends of the tying means on tying machines, by which the tying means ends are pressed together between an upper and a lower pressing jaw and by which a gripper is provided which is displaceable from one side of the tying position to the other side, and a cutter-knife for separating the tying means is coordinated to the gripper.

Devices of this type are known by which the gripper goes around the pressing jaw in order to arrive from one side of the tying position to the other side. By this the disadvantage obtained is greater, more costly and entails heavy construction forms which are associated with relatively high production costs. Further there exists a longer path of the gripper during the moving around the pressing jaw, by which the device and consequently the tying machine operates with reduced efficiency.

It is an object of the present invention, particularly that is additionally to the objects and tasks which may be gathered from the specification and the claims, to provide a device of the generic type of simple and compact construction such that the gripper only needs to travel or return a small path, while attaining a higher tying efficiency.

It is another object of the present invention to aid the solution of the above-mentioned object in the manner that the lower pressing jaw is disposed on one side surface of the gripper and is displaced with the latter.

As a result of such formation, a device in accordance with the generic type is provided which is characterised substantially on the one hand by the simplified construction on the other hand by a raised operating performance. Conditioned upon the joint displacement of the pressing jaw and the gripper, the latter only needs yet to run through a small path. The required time is shorter as a result. Further the construction parts controlling the gripper are simpler and can be held smaller, which leads to the previously mentioned compact construction form. In practice, this appears such that with customary overlapping lengths of the tying means ends, the device in accordance with the present invention is approximately half as large as the known device. This considerable reduction brings the advantage of a lower weight and permits the production costs to be reduced. Then, the entire tying machine can have a more compact construction underneath the tying table. Also the device in accordance with the present invention, as a result of the shorter gripper path, operates unsusceptible to disturbance compared to the known solutions.

An advantageous feature in accordance with the present invention resides in that the lower pressing jaw is mounted longitudinally displacable to the gripper, is arranged in pressing position above a ram and is acted upon by the latter. In spite of a joint displacement of the gripper and the pressing jaw, the latter is displacable relative to the gripper. The pressing jaw in the pressing position then lies above the ram which assumes the actual control of the pressing jaw. The connection or binding of the ends of the tying means can, e.g., take place by bonding or by a clip, staple or the like.

It proves advantageous in accordance with the present invention that one of the upper edges of the lower pressing jaw, which edge points to one of the one gripper holder plate, forms the knife-edge. In this manner the lower pressing jaw fulfills a double function. On the one hand it serves for the pressing together of the ends of the tying means and on the other hand it separates the tying means in two parts after the finished tying. The cutting action is achieved thereby as a result of the displacement of the pressing jaw with respect to the gripper.

Beyond that it is of advantage in accordance with the present invention that the lower pressing jaw is spring-biased in the opening direction. Guarantee is consequently provided that after the finished connection operation of the ends of the tying means, for example by bonding, the pressing jaw always is returned into its predetermined correct starting position.

From a control technique point of view, it is advantageous in accordance with the present invention that the ram sits on the free end of a cam-controlled pivot lever. With each common or joint displacement of the gripper and the pressing jaw, this steps back out of the movement path or track and permits a disturbance-free displacement of the pressing jaw and the gripper. It steps into action only during the closing or finishing operation.

Finally it is still of advantage in accordance with the present invention that there exists a spring-biased free floating between the ram and the pivot lever. This construction form is particularly selected if the connection of the ends of the tying means occurs by bonding. The heating lamella which moved between the ends of the tying means can then be displaced back after the completed heating-up operation without damage to the corresponding tying means sections. After this return displacement and with the pressing jaw stepped into the pressing position, then only a pressure is exerted corresponding to the spring force of the ram, which leads to no disadvantageous compressing of the ends of the tying means.

With the above and other objects and advantages in view, the present invention will become more clearly understood in connection with a preferred embodiment thereof, when considered with the accompanying drawings, of which:

Figure 1:
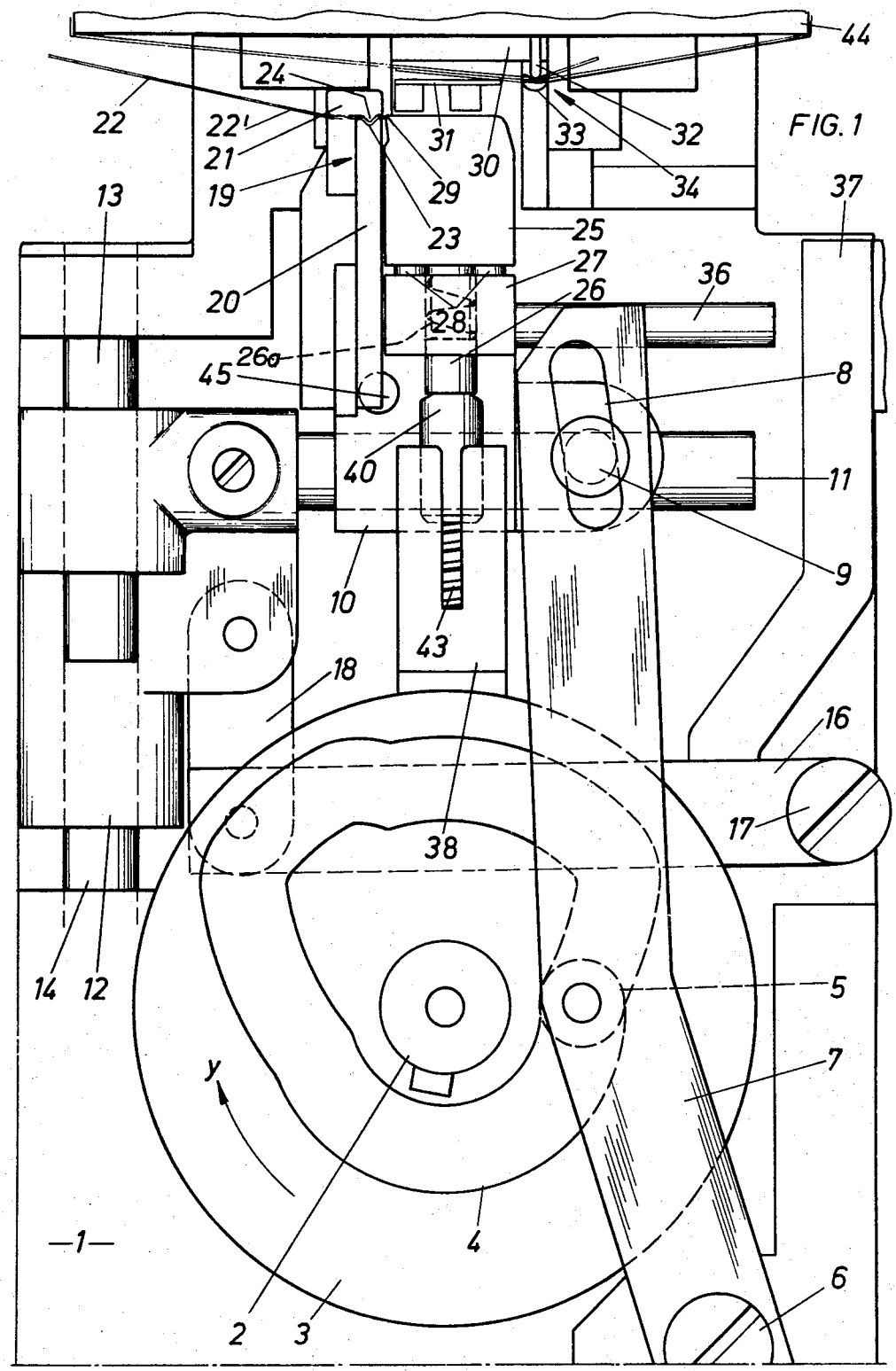
FIG. 1 is an elevational view of the device of the present invention.

FIGS. 3–8, inclusively, are broken away sectional views similar to FIG. 1 of the upper range of the device in different working positions during the tying of a package.

Referring now to the drawings, the device in accordance with the present invention possesses a housing 1. A drive shaft 2 is mounted in the lower range of the housing 1. Inside of the housing the drive shaft 2 carries cams (not illustrated) as well as a cam wheel 3, the latter disposed at the front side of the housing 1.

The cam 3 is provided with a control slot 4, in which there engages the control roller 5 of the lever 7, the latter being mounted about the bolt 6. The free end of the lever 7 forms a driver slot 8 through which there passes a pin 9 of the carriage 10. Horizontally directed slide rods 11 serve for guiding the carriage 10, which slide rods extend from the slide 12, the latter being displaceable in height. Rods 13 and 14 which are stationarily mounted in the housing serve for guiding the slide 12.

The displacement of the slide 12 takes place by means of the cam 3, which possesses a control slot (not illustrated) on its rear side, in which there penetrates the control roller 15 of a one-armed lever 16. The lever 16 is mounted about the axle 17. A connecting rod 18 transmits the displacement of the lever 16 to the slide 12.

The carriage 10 is the carrier of the gripper 19. The gripper holder plate 20 and the clamping jaw 21 which is coordinated to the latter are parts of the gripper 19. The gripper holder plate 20 is provided with an indentation or notch 23, the latter being aligned transverse to the tying means 22, and which notch 23 lies opposite to a correspondingly formed rib 24 of the clamping jaw 21.

Further the carriage 10 carries the pressing jaw 25. The control pin 26 extends from the lower side of the latter, which control pin 26 is set through a guide block 27 of the carriage 10.

Guide pins 28 which are located on both sides of the control pin 26 serve for securing the pressing jaw 25 against rotation. By means of a spring 26a, the pressing jaw is spring-biased in the direction of the guide block 27, thus in the opening direction.

The pressing jaw 25 is formed with a knife-edge 29 on its upper edge which points toward the gripper holder plate 20.

With respect to the pressing jaw 25, it relates to the lower pressing jaw which lies opposite the upper pressing jaw 30. Control means (not illustrated) permit the upper pressing jaw 30 to undergo a displacement in the direction of the arrow x.

The heating lamella or plate 31 which is displaceable transversely with respect to the tying plane extends in the range between the upper and lower pressing jaws.

The upper pressing jaw 30 is the carrier of a clamping piece 32. The latter is coordinated to a clamping slide or bolt 33, which previously named parts constitute the band or tape clamp 34. The clamping slide 33 in its turn is displaceable transversely relative to the tying plane.

A guide web 21' extends from the clamping jaw 21, which guide web 21' forms a guide-through opening 35 for the tying means 22.

The lower pressing jaw 25 and the gripper-holder plate 20 are likewise displaceable in the direction of the arrow x. For this purpose a pin 36 extends from the guide block 27. The latter is acted upon by a cam controlled lever 37.

Beyond that still a further cam controlled pivot lever 38 is provided. The free end 39 thereof guides a ram or pusher rod 40. A cross pin 41 of the latter is set through a longitudinal slot 42 of the pivot lever 38 and limits the path of the displacement of the ram 40, the latter being biased by a compression spring 43.

Figure 2:
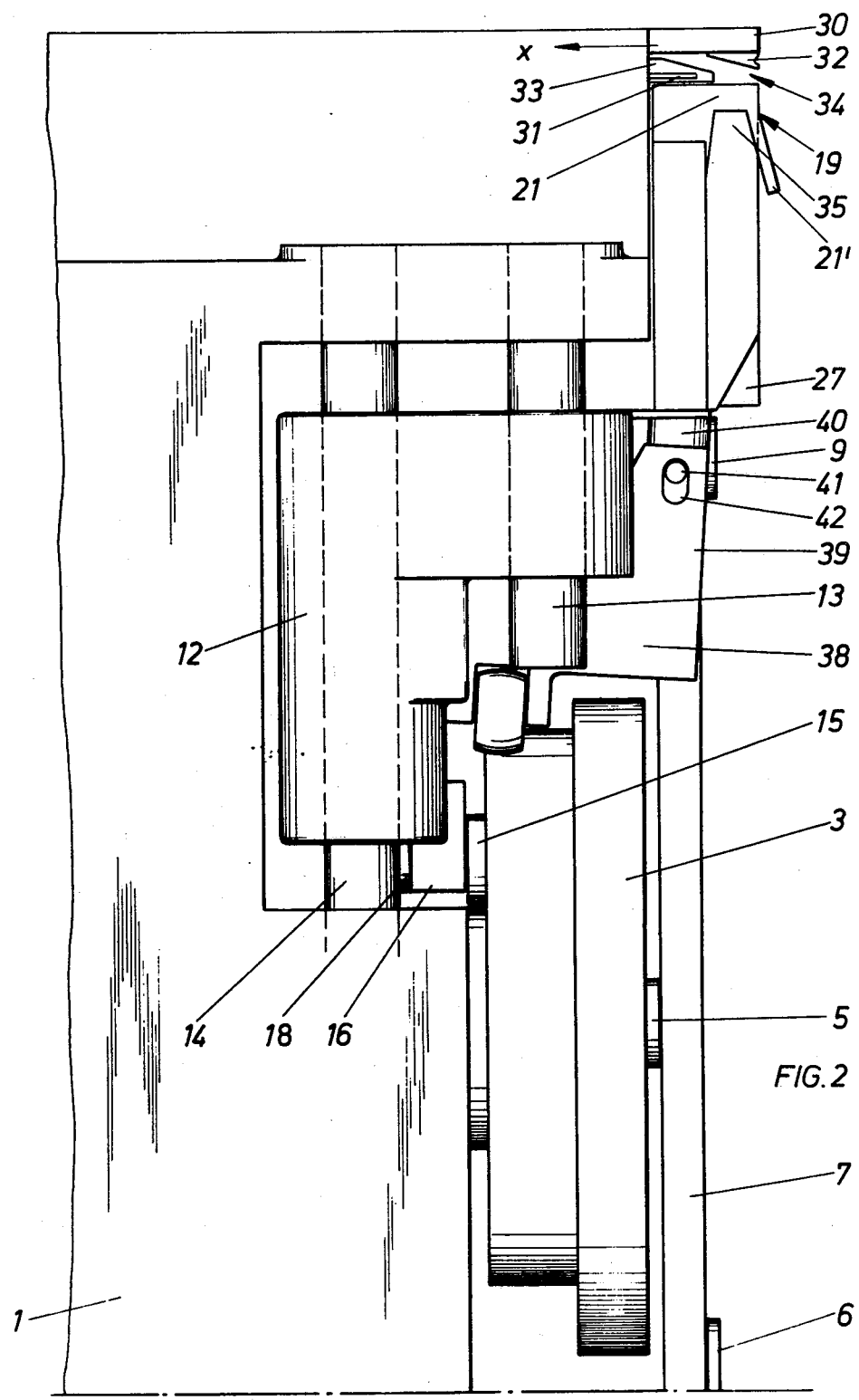
FIG. 2 is a flip side elevational view from the left of FIG. 1.

The following manner of operation takes place: In FIGS. 1 and 2, the starting position of the device is illustrated. A package 44 is completely tied up and still lies on the machine table. The end 22' of the tying means is held by the gripper 19. After a certain partial rotation of the cams in the direction y, the position according to FIG. 3 is attained. In the meantime however the rotation is interrupted. In this position the upper pressing jaw 30 is displaced back in the direction of the arrow x out from the tying plane so that the completely tied package can be removed and a new package can be laid thereon. The lever 7 displaced the carriage 10, according to FIG. 3, on the slide rods 11 of the slide 12. Consequently the gripper 19 and also the lower pressing jaw 25 are located on the other side of the tying position. In order to make this cross displacement possible, the lever 38 was withdrawn or gave way in the downward direction. According to FIG. 3 the pin 36 of the block 27 extends in the pivoting range of the cam controlled lever 37. Moreover also the upper pressing jaw 30 again travels into its starting position according to FIG. 1.

After a further certain rotation of the drive shaft 2, the position according to FIG. 4 is reached. The lever 16 has displaced the slide 12 upwardly and consequently also the carriage 10. The gripper 19 has moved to the level of the upper pressing jaw 30. The tying means end 22' steps against the clamping piece 32 and is held by the clamping slide 33 (the latter having moved counter to the arrow direction x) between these two parts. At this moment a double clamping occurs, on the one hand by the band clamp 34, and on the other hand by the gripper 19.

According to a further rotating step, the position according to FIG. 5 occurs. The gripper 19 and the lower pressing jaw 25 are still further displaced by means of the lever 7. Simultaneously the cam control lever 37 acts upon the pin 36, which accordingly as a consequence causes a displacement of the pressing jaw 25 and also of the gripper-holder plate 20. This displacement of the gripper-holder plate which is directed transverse to the tying plane leads to an opening of the gripper 19, so that the end 22' of the tying means exclusively is held by the band clamp 34. The tying means can not be laid completely about the package 44 in this position from the tying arm (not illustrated) of the machine and is then guided through the opening 35 of the clamping jaw 21. In this manner the tying means 22 already steps into the range between the notch 23 and the rib 24.

Subsequently after a further partial rotation of the drive shaft 2, the position according to FIG. 6 is reached. The gripper 19 and the lower pressing jaw 25 now again have been displaced back by means of the cam control lever 7. In this manner the pin 36 steps out from the operating range of the lever 37. The lower pressing jaw 25 and the gripper-holding plate 20 by themselves were able to displace forwardly opposite to the arrow direction x. In this manner the gripper 19 stepped into the clamping position. The displacing back of the gripper-holding plate 20 and the pressing plate 25 takes place by a spring-biased pressing pin 45. In the position according to FIG. 6, the slide 12 has again been moved downwardly by the corresponding control means.

Figure 7:
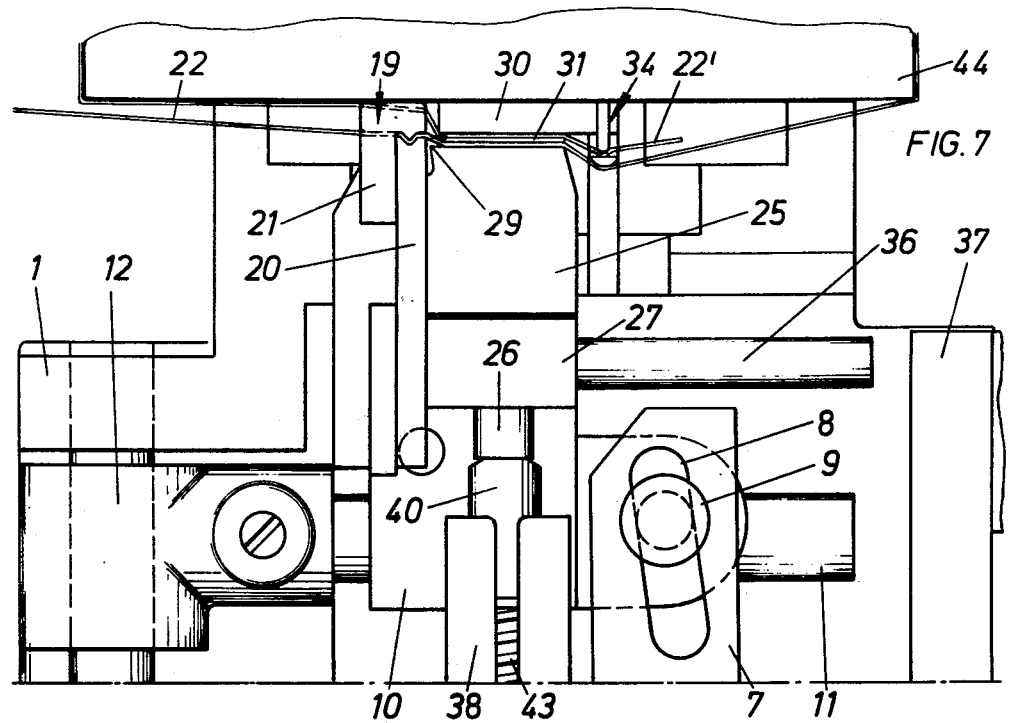

FIG. 7 shows the next intermediate position. The lever 7 has now displaced the carriage 10 completely to the other side. Simultaneously the slide 12 once more has been lifted so that now the gripper 19 is located next to the upper pressing jaw 30. The servo or pre-controlled heating lamella 31 extends between the tying means end 22' and the corresponding section of the tying means 22. Moreover the ram 40 has been brought into action over the cam controlled pivot lever 38, which ram 40 acts on the control pin 26 of the pressing jaw 25 and loads and biases the latter in the direction of the connection or binding position.

Figure 8:
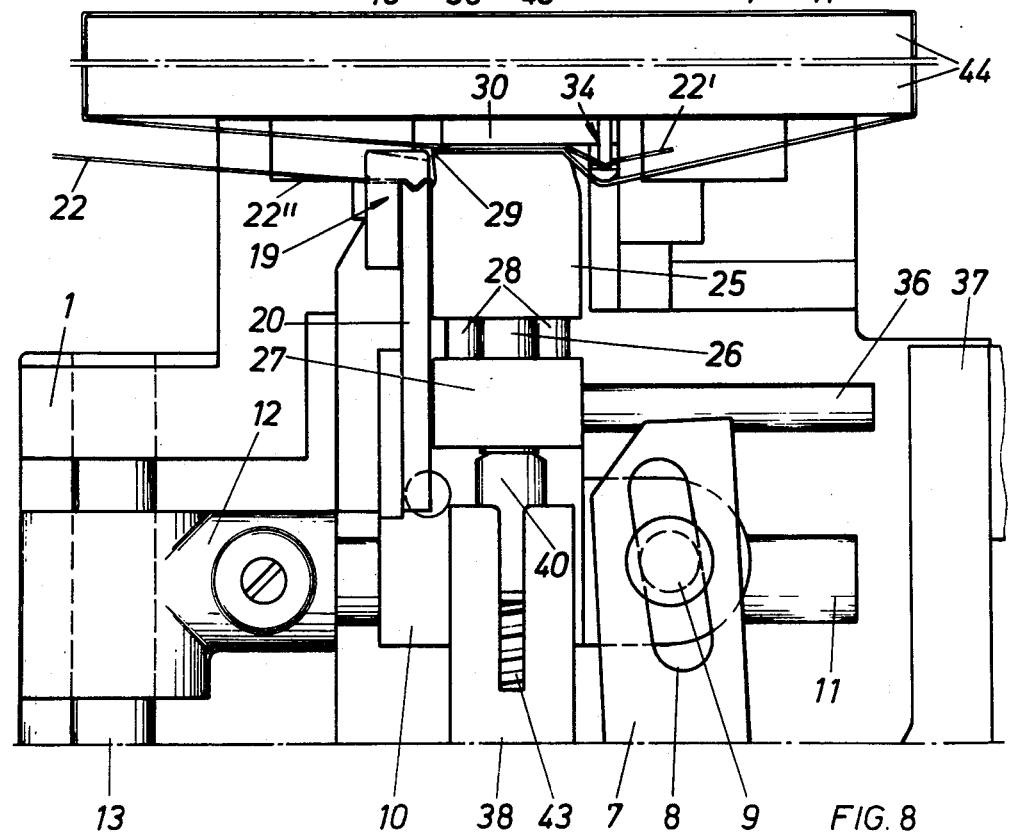

After a certain time of heating-up of the tying means, the latter being formed as a synthetic material band or tape, the position according to FIG. 8 is attained. The heating lamella 31 is then located in the displaced-back position and the lower pressing jaw 25 brings the heated-up tying means sections in adhering bonding connection. Nevertheless the slide 12 is displaced downwardly by a certain amount. In this manner the carriage 10 can move therewith. The pressing jaw 25 remains by this downward displacement in its pressing position due to the not displacing pivot lever 38 and the ram 40. Dependent upon the downward displacement of the carriage 10, likewise a downward movement of the gripper 19 occurs, whereby the tying means 22 is cut in two by the knife-edge 29 of the pressing jaw 25. In this manner one of the tying means ends 22" which is held by the gripper 19 is obtained for the next tying operation. In the position according to FIG. 8, yet still the other tying means end 22' is held by the band clamp 34. The release of the tying means end 22' occurs only with further partial rotation of the drive shaft 2 into the starting position according to FIG. 1. In this manner the clamping slide 33 of the band clamp travels back in the arrow direction x. Then for sure the corresponding tying means sections are already connected.

I claim:

1. An apparatus for connection of the ends of a tying means at a tying position on tying machines, comprising:

means for connecting the ends of the tying means including an upper pressing jaw means and a lower pressing jaw means for cooperatively pressing the ends of the tying means together in a pressing position, a gripper means for holding one of the ends of the tying means, said gripper means mounted displaceable from one side of the tying position to the other side, said gripper means having side surfaces, a cutter-knife means for separating the tying means being arranged on said lower pressing jaw means adjacent to and for cooperating with said gripper means so as to cut the tying means during a relative movement, said lower pressing jaw means being arranged directly adjacent one of said side surfaces of said gripper means and being mounted displaceable with and relative to the latter, means for moving said gripper means and said lower pressing jaw means jointly with and relatively to each other, respectively.

2. The apparatus as set forth in claim 1, wherein:
    said lower pressing jaw means is mounted longitudinally displaceable relative to said gripper means,
    a ram means for pressing said lower pressing jaw means into said pressing position, said lower pressing jaw means being disposed over said ram means in said pressing position.

3. The apparatus as set forth in claim 2, wherein:
    said moving means includes,
    a pivot lever having a free end,
    cam means for controlling said pivot lever,
    said ram means is seated on said free end of said pivot lever.

4. The apparatus as set forth in claim 3, further comprising:
    a spring-biased free-floating mounting means between said ram means and said pivot lever for mounting said ram means in a spring-biased free-floating condition relative to said pivot lever.

5. The apparatus as set forth in claim 4, wherein:
    said means for connecting the ends of the tying means further includes a heating lamella for stepping between and for heating the ends of the tying means during a portion of the time while said pressing jaw means are in said pressing position.

6. The apparatus as set forth in claim 5, wherein:
    said pivot lever is formed with a longitudinal slot,
    a cross pin extends from said ram means through said longitudinal slot and is longitudinally displaceable therein.

7. The apparatus as set forth in claim 2, wherein:
    said ram means is fixedly aligned with said upper pressing jaw means,
    said moving means for laterally moving said lower pressing jaw means jointly with said gripper means away from said ram means.

8. The apparatus as set forth in claim 3, wherein:
    said moving means further includes slide means for moving said gripper means longitudinally downwardly relative to said lower pressing jaw means and said cutter-knife means thereon, whereby the latter cuts said one end of the tying means gripped by said gripper means,
    said moving means via said cam means, said pivot lever and said ram means for maintaining said pressing position and pressing said ends of the tying means together while said slide means moves said gripper means relative to said lower pressing jaw means.

9. The apparatus as set forth in claim 8, further comprising:
    a carriage mounts said gripper means,
    said slide means for moving said carriage longitudinally,
    a guide block is secured in said carriage,
    a control pin is connected to said lower pressing jaw means and longitudinally displaceably extends downwardly through said guide block and abuts said ram means in said pressing position,
    said lower pressing jaw means is spring-biased in a direction of an opening position of said lower pressing jaw means away from said upper pressing jaw means, said moving means further for laterally moving said lower pressing jaw means jointly with said gripper means away from said ram means, whereby said opening position automatically occurs when said control pin is disposed laterally away from said ram means.

10. The apparatus as set forth in claim 1, wherein:
    said gripper means includes a gripper - holder plate,
    said lower pressing jaw means has upper edges, one of said upper edges points to said gripper - holder plate,
    said one upper edge of said lower pressing jaw means is formed as a cutter-edge of said cutter-knife means.

11. The apparatus as set forth in claim 1, wherein:
    said lower pressing jaw means is spring-biased in a direction of an opening position of said lower pressing jaw means away from said upper pressing jaw means.

* * * * *